Patented Mar. 22, 1949

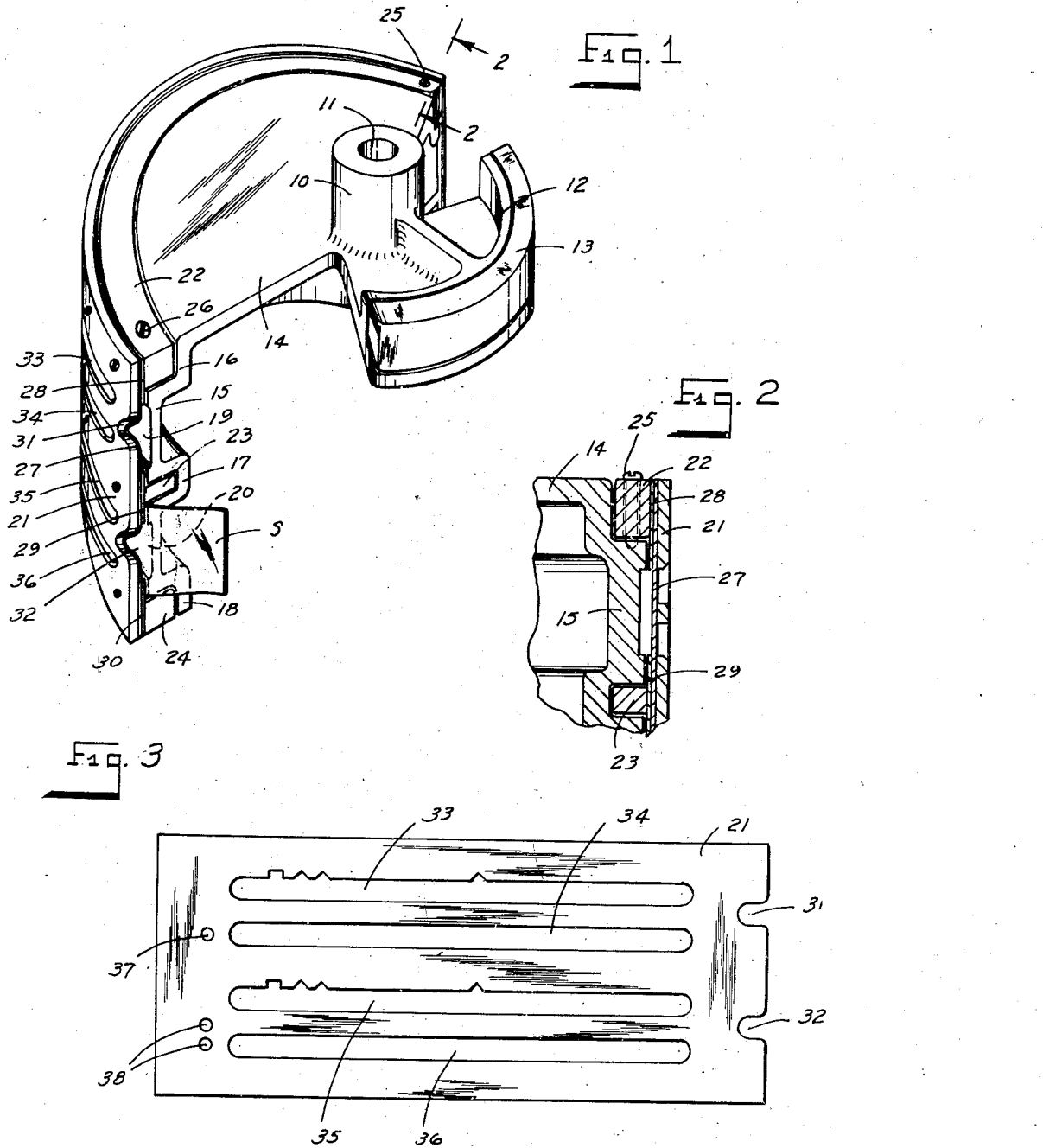

2,464,892

UNITED STATES PATENT OFFICE 2,464,892

ROTATING FILM CARRIER HAVING OVERLYING OPTICAL DENSITY WEDGE FOR SENSITOMETERS

Bruno C. Roehrl, Erie, Pa., assignor to General Aniline & Film Corporation, New York, N. Y., a corporation of Delaware Application September 4, 1946, Serial No. 694,713

7 Claims. (Cl. 95—10)

1

This application pertains to an invention in a film carrier for a photographic sensitometer, especially a sensitometer of the intensity scale type.

In loading film or other sensitized material into a carrier for retaining that film and moving it relative to a source of radiation, considerable difficulty is experienced since the film must be loaded in a precise manner and the operation must necessarily be performed under extremely faint light or, in many instances, in total darkness.

Accordingly, it is an object of the instant invention to devise a loading system and a carrier for the sensitized material which shall be simple, easily loaded in total darkness, and of such design that the loading operation may be performed with a minimum of effort and with precision and certainty.

It is another object of the invention to devise a carrier for the sensitized material which may be rotated to move the sensitized material past a source of radiation and which may be provided with optical wedges of varying type which shall be readily changeable and which may be employed to obtain exposures of varying characteristics.

It is another object of the invention to devise a carrier for sensitized material to be exposed in an intensity scale sensitometer within which two strips of film or other sensitized material may be simultaneously exposed and while exposed so marked as to be identified upon development.

Other objects will become apparent as the disclosure progresses.

The invention will be described by reference to one particular embodiment which the same may take and by further reference to the accompanying figures of drawing, in which:

Fig. 1 is a perspective view showing the assembled carrier and the manner in which a film may be inserted therein.

Fig. 2 is a section taken at line 2—2 through part of the rim and web of the carrier, Fig. 1.

Fig. 3 is a developed detail view of the mask.

Referring to Fig. 1, the preferred form which the carrier takes is that of a partial drum having a hub 10 within a central bore 11 of which would normally be keyed or otherwise retained as by a set screw, the shaft of a driving means, such as a synchronous electric motor or a spring type motor, governed to rotate at a predetermined and constant speed. The exposure of the sensitized material normally involves one pass by an aperture through which is projected a rectangular

2 beam of light of the desired spectral quality or characteristics. Preferably, the rotation of the drum is first built up to the predetermined number of revolutions per minute, whereupon exposure is effected by opening a shutter thereby permitting the light rays to reach the sensitized material. The termination of the exposure is then effected after one complete passage of the sensitized material through the light rays and the carrier stopped after which the exposed sensitized material is removed for developing and further processing. The control of exposure and other details have been disclosed and claimed in the application above identified and no further description thereof is necessary at this point.

Since a fairly high rotative speed may be reached, the partial drum which as herein illustrated comprises slightly less than 180° of circumference and is counterbalanced by a sector 12 having a counterbalance weight 13 attached thereto. The counterbalance is normally to be made from relatively heavy metal while the remaining parts of the device may be machined from lighter material, such as aluminum or aluminum alloy, thereby to reduce the total mass so that the parts may be brought up to speed within a minimum period of time. The film carrying part of the device comprises the web 14 and the cylindrical partial drum portion or rim 15 which is shouldered or channeled to provide annular recesses as at the portions 16, 17, and 18. The said rim 15 is relieved at 19 and at 20 while at either end adjacent the said relieved portions, there are machined surfaces against which the film or other sensitized material may be supported.

A mask 21 shown in a developed view, Fig. 3, is comprised as an arcuately shaped part concentric with the hub 10 and rim 15. This mask 21 is a part of a gate which, in addition to the mask, includes the partial rings 22, 23, and 24. The rings 22 and 24 at the outer edges of the mask fit within the recesses in the angular portions 16 and 18 and are also pivoted on the pivot screws 25. These pivot screws, as shown in detail in Fig. 2, and of which there are two, one at the top and one at the bottom, are threaded through the rings and project into cooperating holes in the rim 15. Ring 23 fits into the recess in projection 17. The entire gate assembly which includes the rings 22, 23, and 24, the mask 21, and other parts later to be described, may be swung away from the rim 15 and when closed may be locked in position by a set screw or locking screw 26.

The mask 21 has positioned adjacent the inner surface thereof an optical density wedge 27 which may be one of several different types, such as the usual stepped optical wedge, or a wedge of continuously modulated type, that is, having a continuous variation from one end to the other throughout some definite range of densities from a maximum to a minimum. Between the wedge 27 and the rings are fixed shims or spacers 28, 29, and 30. A plurality of screws are threaded into the rings and pass through the mask, wedge and shims thereby to hold the said parts in assembled relationship. When it is desired to change the optical wedge, these screws are removed and a new wedge may be substituted after which the parts may again be assembled.

Normally, the gate which includes the mask and attached elements is maintained in closed position, that is, the position illustrated in the Figs. 1 and 2. It may be opened for various purposes, one of which is that of changing the optical wedge. As can be seen from both Figs. 1 and 2, the relationship of the parts is such that when closed and locked in position, the space between the unrelieved surfaces of the rim 15 and the inner faces of the shims 28 and 30 is just sufficient for insertion of a strip of film or other material, the sensitivity characteristics of which are to be determined. The method of loading the film involves a simple operation of inserting one end into the space provided between the rings 22 and 23, and 23 and 24, and between the abovementioned faces of the rim and shims, the outer edges or ends of the parts being rounded to facilitate entrance of the film strip. The dimensions are just sufficient so that when fully inserted, a standard sensitometer strip will enter the arcuate space provided therefor and will stop against a pin or other stop element (not shown) at the end of the drum adjacent the hinge pivots 25, but at the same time will extend substantially to the end of the rim 15 so that the notches 31 and 32 may facilitate engagement of the strip by the operator's finger so as to withdraw it after exposure.

The instrument for which the carrier herein described is to be employed is adapted to expose two strips simultaneously. Of course, one or any convenient number of strips may be provided for depending upon the capacity of the sensitometer. In some instances, it may be sufficient to have one light admitting slot the full width of the film strip so that substantially the entire width of the strip may be exposed as modulated due to the density steps or other density variation lengthwise of the wedge. Here each of the strips is to be exposed throughout two narrow areas lengthwise thereof, one of which is exposed by light passing through the mask aperture 35 and the other of which is exposed through the aperture 34, considering the top strip only. Apertures or slits 35 and 36 provide for similar exposure of the lower strip. A plurality of notches identify the particular mask or the particular sensitometer within which the strip has been exposed and for the top strip a single opening 37 and for the lower strip two openings 38 serve to provide for latent images which upon later processing will indicate at which of the levels any particular strip was exposed. Of course, the mask may be varied depending upon the time of exposure desired and any particular carrier may be provided with a plurality of masks of different types as well as with different wedges.

Assuming that the mask and wedge are of the particular type or design to be employed for certain sensitometric work, the instrument operated under safe light or in total darkness is loaded by pushing the sensitometer strips into the arcuate slots as indicated by the strip S, Fig. 1, the said strip being pushed in until it stops against a stopping pin or other abutment previously described.

In some instances, it may not be necessary to counterbalance the carrier and the general characteristics may be altered to the extent that the rim may be supported by spokes or other means projecting from the hub outwardly to the rim itself. Various details may be altered and instead of designing to accommodate the usual sensitometer strips which have become more or less standardized, the carrier may be adapted to take any size of sensitized material, either film or coated paper. It is especially adapted to color work as well as the black and white material and the technique of exposure, the illumination, and the optical density wedge may be varied in accordance with other factors while retaining the same general principles of construction for the device and the same general mode of operation.

The device has been described by illustrating and disclosing one embodiment which functions in a rotary manner. It is conceivable that the principles of the invention may be applied to a sensitometer in which the movement of the strip may be other than rotary, for example, may move in a rectilinear pathway. The carrier may in some instances be stationary and the source of radiation may be caused to move relatively to it.

While the preferred embodiment of the invention contemplates light reaching the sensitized material from a direction radially of the carrier and toward the center thereof, it is quite within the possibilities of the concept to reverse the general arrangement and to direct the light beam radially outward from the center. In that event the film or other emulsion must be faced inwardly, the mask and rim reversed in their radial positions, and the optical density wedge likewise positioned between the mask and specimen and on the light source side of the latter.

The term "rim" has been employed in the specification and claims. It is to be given a broad interpretation and includes an edge or border portion of sufficient size for the purpose and may be a part of any supporting structure adapted to retain the specimen, wedge, and mask and to be progressed across the light beam rectilinearly, in a true rotary motion, or in some other arc not part of a true circle.

Instead of hinging the gate as illustrated in Figs. 1 and 2, it may be detachable by any other means; for example, it may be so designed as to be bodily removable from the rim and may be attachable by any convenient means, such as a retaining clamp or clamps, at both ends.

While one embodiment of the invention has been disclosed, it is to be understood that the inventive concept may be carried out in a number of ways. This application is, therefore, not to be limited to the precise details described, but is intended to cover all variations and modifications thereof falling within the spirit of the invention and the scope of the claims.

I claim:

1. In a carrier for sensitized material for a photographic sensitometer, the combination of a rotatable member comprising hub and rim portions, a gate attached to said rim for closing a space between one face thereof and an adjacent face of said rim portion to define between said faces an arcuate space within which may be inserted a sensitometric specimen, means mounting the gate for movement away from said rim to permit access to the said space therebetween, an optical density wedge carried by said gate overlying one side of the arcuate space, and an opening in said gate in registration with a part of the arcuate space and through which light enters to be modified by said wedge for exposing said specimen.

2. In a carrier for sensitized material for a photographic sensitometer, the combination of a rotatable member comprising hub and rim portions, a gate attached to said rim for closing a space between its inner face and the outer face of said rim portion to define between said faces an arcuate space within which may be inserted a sensitometric specimen, means mounting said gate for movement moved away from said rim to permit access to the said space therebetween, an optical density wedge carried by said gate overlying one side of the arcuate space when inserted, and a plurality of masked openings in said gate registration with a part of the arcuate space and through which light enters to expose the specimen as modified by the wedge, said masked openings being symmetrically disposed with respect to the width of the said specimen.

3. In a carrier for sensitized material for a photographic sensitometer, the combination of a movable member comprising a rim portion, a gate attached to said rim for closing a space between one of its faces and the adjacent face of said rim portion to define between said faces an elongated space within which may be inserted a sensitometric specimen, means mounting of the said gate for movement away from said rim and an optical density wedge sandwiched between said gate and rim overlying one side of said elongated space, and an opening in said gate in registration with said elongated space and through which light enters to expose the specimen, by passing through said density wedge to be modified thereby before it falls upon the specimen.

4. In a carrier for sensitized material for a photographic sensitometer, the combination of a rotatable member comprising hub and rim portions, a gate attached to said rim for closing a space between its inner face and the outer face of said rim portion to define between said faces an arcuate space within which may be inserted a sensitometric specimen, means mounting said gate for movement away from said rim to permit access to the said space therebetween, channels in said rim and cooperating rings attached to said gate to be received within said channels when the gate is closed, an optical density wedge carried by said gate overlying one side of said arcuate space, shims spacing said rings and wedge and completing in combination with the said rings and outer face of the rim, guiding slots within which the said specimen may be retained, and a masked opening in said gate in registration with said arcuate space and through which light enters to be modified by said wedge for exposing said specimen.

5. In a carrier for sensitized material for a photographic sensitometer, the combination of a rotatable member comprising hub and rim portions, a gate pivoted to said rim for closing a space between its inner face and the outer face of said rim portion to define between said faces an arcuate space within which may be inserted a sensitometric specimen, means for locking said gate in closed position, channels in said rim and cooperating rings attached to said gate to be received within said channels when the gate is closed, an optical density wedge carried by said gate overlying one side of the arcuate space, shims for spacing said rings and wedge and completing in combination with the said rings and face of the rim, guiding slots within which the said specimen may be retained, the said gate having therein a plurality of openings in registration with a part of said arcuate space and symmetrically disposed with respect to the arcuate opening through which the specimen is inserted for permitting entry of light for exposing said specimen.

6. In a carrier for sensitized material for a photographic sensitometer, the combination of a rotatable member comprising hub and rim portions, a gate attached to said rim for closing a space between its inner face and the outer face of said rim portion to define between said faces an arcuate space within which may be inserted a sensitometric specimen, said gate having at one one thereof pivot means mounting the gate for movement away from said rim and at the other end means for locking it in closed position, said gate further comprising an outer mask having light admitting apertures therein, an optical wedge overlying one side of the arcuate space and attached adjacent the inner face of said mask, shims for spacing the specimen from said mask and a plurality of circumferentially extending rings for defining the position of the lateral edges of said specimen and for cooperating with corresponding channels in said rim when the gate is retained in its closed position, and a counterbalance projecting from said hub for balancing said rim and gate portions during rotation.

7. In a carrier for sensitized material for a photographic sensitometer, the combination of a rotatable member comprising hub and rim portions, a gate attached to said rim for closing a plurality of spaces between its inner face and the outer face of said rim portion to define between said faces a like plurality of arcuate spaces within each of which may be inserted a sensitometric specimen, means mounting the said gate for movement away from said rim to permit access to the said space therebetween, channels within said rim and cooperating rings attached to said gate to be received within said channels when the gate is closed, an optical density wedge carried by said gate overlying one side of said arcuate spaces, shims spacing said rings and wedge and completing in combination with the said rings and outer face of the rim, guiding slots within which the said specimens are retained, and masked openings in said gate, at least one for each arcuate space and specimen therein, said openings being in registration with a part of the arcuate spaces for admitting light to expose the specimen as modified by said wedge.

BRUNO C. ROEHRL.

REFERENCES CITED

The following references are of record in the file of this patent:

UNITED STATES PATENTS

| Number | Name | Date |
| --- | --- | --- |
| 511,133 | Fretwell | Dec. 19, 1893 |
| 1,651,151 | Ramsey | Nov. 29, 1927 |
| 1,832,294 | Gent | Nov. 17, 1931 |
| 2,190,553 | Tarr | Feb. 13, 1940 |